US012661712B2

(12) United States Patent

Grall et al.

(10) Patent No.: US 12,661,712 B2

(45) Date of Patent: Jun. 23, 2026

(54) METHOD FOR THE ADDITIVE MANUFACTURE OF A TURBOMACHINE COMPONENT

(71) Applicant: SAFRAN AIRCRAFT ENGINES, Paris (FR)

(72) Inventors: Terence Grall, Moissy-Cramayel (FR); Sébastien Yohann Pouzet, Moissy-Cramayel (FR); Hervé Antoine Frédéric Seince, Moissy-Cramayel (FR); Ronan Mauvoisin, Lassy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 963 days.

(21) Appl. No.: 17/636,096

(22) PCT Filed: Aug. 17, 2020

(86) PCT No.: PCT/FR2020/051469

§ 371 (c)(1),
(2) Date: Feb. 17, 2022

(87) PCT Pub. No.: WO2021/032923

PCT Pub. Date: Feb. 25, 2021

(65) Prior Publication Data

US 2022/0288692 A1    Sep. 15, 2022

(30) Foreign Application Priority Data

Aug. 22, 2019    (FR) ........................................ 1909344

(51) Int. Cl.
B22F 12/20 (2021.01)
B22F 10/22 (2021.01)
(Continued)

(52) U.S. Cl.
CPC .............. B22F 12/20 (2021.01); B22F 10/22 (2021.01); B23K 26/14 (2013.01); B23K 26/342 (2015.10);
(Continued)

(58) Field of Classification Search
CPC B23K 15/0086; B23K 37/003; B23K 26/342; B22F 5/009; B22F 10/25
See application file for complete search history.

(56) References Cited

U.S. PATENT DOCUMENTS

| | | | | |
|---|---|---|---|---|
| 4,309,590 A | * | 1/1982 | Stol ...................... | B23K 9/0213 |
| | | | | 219/136 |
| 2018/0200818 A1 | * | 7/2018 | Williamson ........... | B23K 3/047 |

(Continued)

FOREIGN PATENT DOCUMENTS

| | | |
|---|---|---|
| CN | 108724717 A | 11/2018 |
| EP | 2 705 942 A1 | 3/2014 |

(Continued)

OTHER PUBLICATIONS

English translation of Written Opinion mailed Oct. 8, 2020, issued in corresponding International Application No. PCT/FR2020/051469, filed Aug. 17, 2020, 6 pages.

(Continued)

*Primary Examiner* — Thien S Tran
(74) *Attorney, Agent, or Firm* — CHRISTENSEN O'CONNOR JOHNSON KINDNESS PLLC

(57) ABSTRACT

A method for manufacturing a component, in particular a turbomachine component, in the form of a plurality of superposed layers of a material, includes a step of supplying the material into a feed nozzle and a step of projecting energy towards the feed nozzle to cause the material passing (Continued)

through the latter to melt. The method further includes a step of cooling the feed nozzle with a cooling element during the step of projecting energy.

23 Claims, 2 Drawing Sheets

(51) Int. Cl.
    *B23K 26/14*        (2014.01)
    *B23K 26/342*       (2014.01)
    *B23K 101/00*       (2006.01)
    *B33Y 10/00*        (2015.01)
    *B33Y 30/00*        (2015.01)

(52) U.S. Cl.
    CPC ............... *B33Y 10/00* (2014.12); *B33Y 30/00*
        (2014.12); *B22F 2201/02* (2013.01); *B22F*
        *2201/11* (2013.01); *B23K 2101/001* (2018.08)

(56)                References Cited

U.S. PATENT DOCUMENTS

2019/0030602 A1*    1/2019    Sachs ..................... B33Y 70/00
2019/0351497 A1*    11/2019   Käll ....................... B23K 26/34

FOREIGN PATENT DOCUMENTS

| | | | |
|---|---|---|---|
| EP | 3 388 171 A1 | 10/2018 | |
| EP | 3 498 402 A1 | 6/2019 | |
| WO | 2016/086912 A2 | 6/2016 | |
| WO | WO-2018134264 A1 * | 7/2018 | .......... B23K 1/0056 |
| WO | 2019/035810 A1 | 2/2019 | |

OTHER PUBLICATIONS

International Preliminary Report on Patentability mailed Feb. 17, 2022, issued in corresponding International Application No. PCT/FR2020/051469, filed Aug. 17, 2020, 8 pages.
International Search Report mailed Oct. 8, 2020, issued in corresponding International Application No. PCT/FR2020/051469, filed Aug. 17, 2020, 6 pages.
Written Opinion mailed Oct. 8, 2020, issued in corresponding International Application No. PCT/FR2020/051469, filed Aug. 17, 2020, 7 pages.
Third Chinese Office Action mailed Sep. 2, 2024, issued in corresponding Chinese Patent Application No. 202080058094.1, filed Feb. 17, 2022, 9 pages.
Dong Shiyun, "Laser Additive Remanufacturing Technology," published on May 31, 2019, 13 pages.
Second Chinese Office Action mailed May 15, 2024, issued in corresponding Chinese Patent Application No. 202080058094.1, filed Feb. 17, 2022, 21 pages.

* cited by examiner

METHOD FOR THE ADDITIVE MANUFACTURE OF A TURBOMACHINE COMPONENT

FIELD OF THE DISCLOSURE

The present disclosure relates to the field of additive manufacturing of components, in particular in aeronautics.

BACKGROUND

The prior art is illustrated, for example, by documents US-A1-2019030602, EP-A1-2 705 942, WO-A2-2016086912, EP-A1-3 388 171, EP-A1-3 498 402, WO-A1-2019035810.

The additive manufacturing technology allows to produce complex components, in particular without machining, by depositing and stacking successive layers of a material intended for the manufacture of the component and to consolidate them partially or totally. This technique has been progressing for several years and in an important way. The additive manufacturing comprises, but is not limited to, the selective laser melting (SLM), the electron beam powder melting (EBM) and the direct metal melting (LMD). In the LMD technique, the material can be fed in powder form (LMD-powder) or in wire form (LMD-wire).

The principle of the technique of the LMD with a supply of material in the form of wire consists in the layering by deposition of the wire of molten material. This is achieved by an additive manufacturing installation comprising a nozzle for feeding the wire and an element for generating an energy to the wire so as to melt it and obtain a molten material (or fusion bath) which is deposited on a support of the final component.

The method can be long depending on the amount of material to be deposited and the deposition time. The energy supplied to the wire to melt it generates a temperature rise in the installation during the entire manufacturing process of the component. The temperature can reach about 2000° C. at the level of the molten material, which can lead to a deformation of certain members of the installation, in particular of the nozzle for feeding the wire. In fact, this feed nozzle (generally made of copper) will, under the effect of heat, lengthen. The elongation can have an impact on the quality of the deposit of the molten material because during the heating of the feed nozzle, the latter will start to expand and thus leave the optimal conditions of deposit. The resulting deposit may have imperfections and be considered as non-compliant upon its inspection. In the worst case, the heating of the feed nozzle leads to a reduction in the passage cross-section of the wire and thus to a stoppage of the wire flow rate.

SUMMARY

The present disclosure is intended in particular to provide a method for manufacturing a component, in particular a turbomachine component, which allows to maintain an optimum output of molten material so as to obtain a quality and compliant material deposit, without impacting the manufacturing times and manufacturing costs.

This is achieved, in accordance with the disclosure, by a method for manufacturing a component, in particular a turbomachine component, in the form of a plurality of superposed layers of a material on a manufacturing support, the method comprising a step of supplying the material into a feed nozzle and a step of projecting energy towards the material, so as to cause the material to melt on the manufacturing support, the method comprising a step of cooling the feed nozzle by means of a cooling element during the energy projection step.

Thus, this solution allows to achieve the above-mentioned objective. In particular, the cooling of the feed nozzle is a simple solution that allows to maintain the geometric characteristics of the feed nozzle and to preserve the quality of the deposit. Such a cooling does not increase the manufacturing time of the component and does not impact the manufacturing cost either.

In another characteristic, the material is in the form of a wire. The deposition of molten material in the form of a material bead with a filler wire is faster. The deposition of the material bead is more regular and clean which implies a better quality of the component in terms of physicochemical and mechanical resistances. Moreover, the yield of the deposited material is important since it is almost 100%.

Another characteristic is that the material is metallic so as to obtain metallic turbomachine components.

As a further characteristic of the method, the cooling element is projected at a pressure of between 1 and 3 bar. Such a pressure is sufficient to cool the feed nozzle without disturbing or altering the melting of the material in the feed nozzle.

Another characteristic is that the cooling element has a temperature in the range of 20° C. This temperature (room temperature) means that no additional energy source is needed to cool the feed nozzle, which is already at a relatively cooler temperature than the melted material in the feed nozzle.

According to another characteristic, the cooling element is a neutral gas flow such as nitrogen or argon. In this way, the cooling allows to provide a better local protection of the material bead obtained from the molten material and deposited by the feed nozzle, since the neutral gas used also serves to inert the enclosure of the installation in which the manufacturing support and the feed nozzle are arranged. The neutral gas also allows to prevent the component from oxidizing during the manufacturing process.

In another characteristic, the energy projection step is performed with a laser beam. Such a configuration is simple to implement while supplying energy and location control. The economic and time savings are thus significant.

Another characteristic is that the cooling element is projected continuously to prevent the temperature of the material in the feed nozzle from rising.

Advantageously, the cooling element and the feed nozzle move simultaneously.

Another characteristic is that it is a wire laser metal deposition (LMD) additive manufacturing.

Advantageously, the cooling element is projected over the entire height of the feed nozzle.

Advantageously, the cooling element is projected from a plurality of spray nozzles directed towards the feed nozzle.

Advantageously, the method comprises a step of depositing the material on the manufacturing support, the step of cooling the feed nozzle being carried out during the projection and deposition step.

The disclosure also relates to an installation for carrying out a method for manufacturing a component, in particular a turbomachine component, in the form of a plurality of superposed layers of a material on a manufacturing support, the installation comprising a feed nozzle for the material intended for manufacturing the component and an element for projecting energy towards the material so as to melt the material on the manufacturing support, at least one spray nozzle being intended for projecting a cooling element onto the feed nozzle.

According to a characteristic of the installation, the spray nozzle is arranged at a distance of between 3 and 10 cm from the feed nozzle. Such a distance allows the spray nozzle to be close enough to cool the feed nozzle and far enough away so that it is not in the path of the energy source intended to melt the material.

Advantageously, the installation comprises several spray nozzles.

In yet another characteristic, the spray nozzles are arranged one above the other in a direction parallel to the height of the feed nozzle so that the cooling of the feed nozzle is uniform over its height.

As a further characteristic, the spray nozzle or all the spray nozzles and the feed nozzle are fixed relative to each other so that continuous cooling is achieved.

DESCRIPTION OF THE DRAWINGS

The disclosure will be better understood, and other purposes, details, characteristics and advantages thereof will become clearer upon reading the following detailed explanatory description of embodiments of the disclosure given as purely illustrative and non-limiting examples, with reference to the following attached figures.

DETAILED DESCRIPTION

Figure 1:
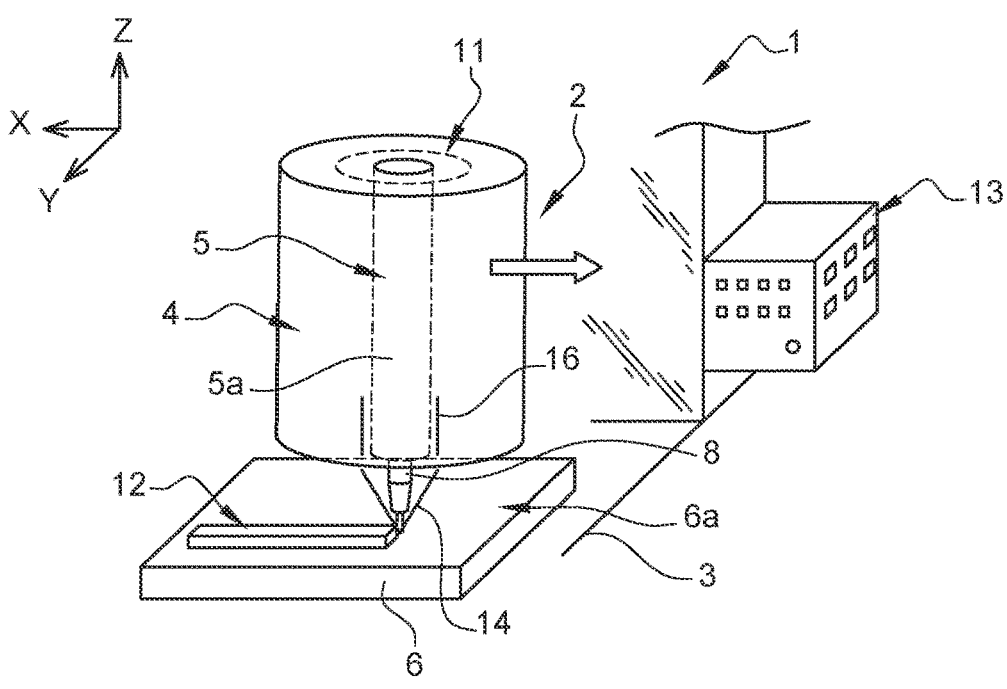
FIG. 1 is a schematic view of an embodiment of an installation for additive manufacturing of a component, in particular for a turbomachine, with a processing head comprising a nozzle for feeding a material to be melted and an energy projection element according to the disclosure.

FIG. 1 shows a partial and schematic representation of an installation 1 for additive manufacturing of components, in particular for turbomachine. Of course, the disclosure is not limited to the turbomachine components.

The installation 1 shown here is a laser metal deposition installation (LMD), in particular an LMD-wire installation, in which a laser beam and a quantity of molten material are simultaneously projected onto a manufacturing support. Each quantity of wire is melted and fused together to form layer by layer the component to be manufactured. This installation and the associated method allow to manufacture complex components in three dimensions. Of course, the filler material intended to allow the manufacturing of the component can be in powder form, i.e. an "LMD-powder" type installation.

The installation 1 in the present example comprises an additive manufacturing device 2 and an enclosure 3 in which this device 2 is installed. The latter comprises a processing head 4 comprising material feed elements 5 on a manufacturing support 6 which is also arranged in the enclosure 3.

The component will be built layer by layer on the manufacturing support 6. The manufacturing support 6 in the present example is stationary and has a working surface 6a defined in a plane that is perpendicular to the plane in FIG. 1. Alternatively, the manufacturing support 6 is movable in a vertical translation. In this case, the manufacturing support 6 is mounted on a movable bottom (not shown) of the enclosure 3.

The material is supplied here in the form of a wire. The feed elements 5 comprise a reel (not shown) from which the wire is taken and on which the wire is wound. Alternatively, the feed elements 5 comprise a feed tank where the wound wire is stored and arranged in the processing head 4. In the present example, the material feed elements 5 comprise a feed conduit 5a which is arranged in the processing head 4 and which passes through the latter along a radial axis Z (which is in the plane of FIG. 1 and which is perpendicular to the plane of the working surface 6a containing transverse Y and longitudinal X axes). The feed conduit 5a is connected to the tank.

The processing head 4 comprises a nozzle 8 for feeding the material which is directed towards the manufacturing support 6, in particular the working surface 6a. As can be seen in FIG. 1, the feed nozzle 8 extends the processing head 4 along the radial axis Z (here vertical). The processing head 4 is brought to move relative to the manufacturing support 6 along at least the three axes (radial Z, longitudinal X and transverse Y) which are perpendicular to each other.

Figure 3:
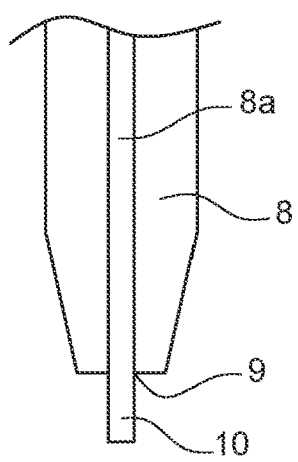
FIG. 3 is a schematic detail view of a material feed nozzle of an additive manufacturing installation according to the disclosure.

With reference to FIG. 3, the feed nozzle 8 comprises a first channel 8a passing through it on both sides along the radial axis, and in particular which opens at a first radial end into the feed conduit 5a (or the tank) and at a second radial end into an outlet orifice 9. This feed nozzle 8 allows to maintain the wire 10 passing through it before it melts.

The wire 10 can have a diameter of about 1 mm depending on the configuration of the processing head and the first channel 8a has a diameter of about 1, 10 (+0.05 mm).

The installation 1 comprises an energy projection element 11 that allows the material to be melted so that it is deposited on the manufacturing support 6 in the form of a bead of molten or melted material 12 as shown in FIG. 1. The energy projection element 11 is connected to a power source that is controlled by an electronic control system 13 of the installation. The energy projection element is directed towards the material leaving the feed nozzle 8 so as to melt the material before it is deposited on the manufacturing support 6.

In the example shown in FIG. 1, the energy projection element 11 is arranged in the processing head 4, the processing head 4 comprises one or more conduits 16 (shown schematically) that open into an orifice defined in an external surface of the processing head 4. The external surface is directed towards the working surface 6a of the manufacturing support 6. The axis of a portion of one conduit 16 or each conduit 16 is transverse to the axis of the first channel 8a and is oriented toward the feed nozzle 8 that extends the processing head 4. The axis of the first channel 8a is coaxial with the processing head 4.

In the present example, the energy projection element 11 comprises a laser beam 14. The axis of the laser beam is coaxial or substantially coaxial (at an angle of more or less than 10 degrees with respect to the radial axis) and oriented towards the working surface 6a of the manufacturing support 6 as seen in FIG. 1.

Figure 2:
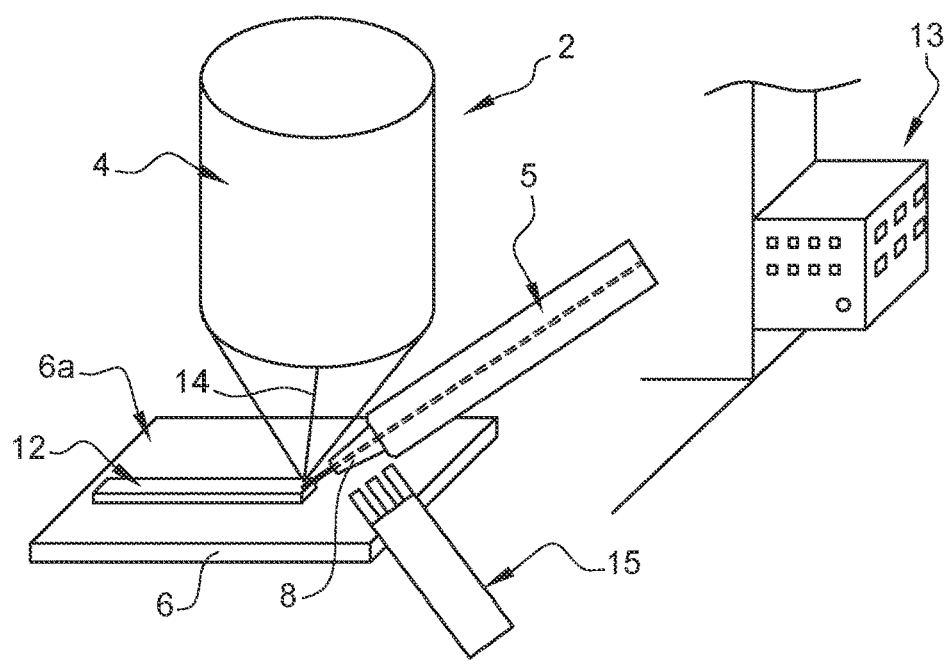
FIG. 2 is a schematic view of another embodiment of an installation for additive manufacturing of a turbomachine component, with a processing head which comprises a nozzle for feeding a material to be melted and which is independent of an energy projection element according to the disclosure.

In FIG. 2, which illustrates a further embodiment of the installation 1, the material feed elements 5 are separate from the processing head 4 and are arranged at a distance from it. The energy projection element 11 is installed in the processing head 4. The projection axis of the energy projection element 11 is transverse to the output axis of the wire in the feed nozzle 8. Advantageously, but not restrictively, the feed nozzle 8 moves together with the processing head 4 and along the longitudinal, transverse and radial axes.

Of course, various techniques using another type of energy to melt the material that will be deposited on the manufacturing support 5 are possible (electric arc or plasma).

Figure 4:
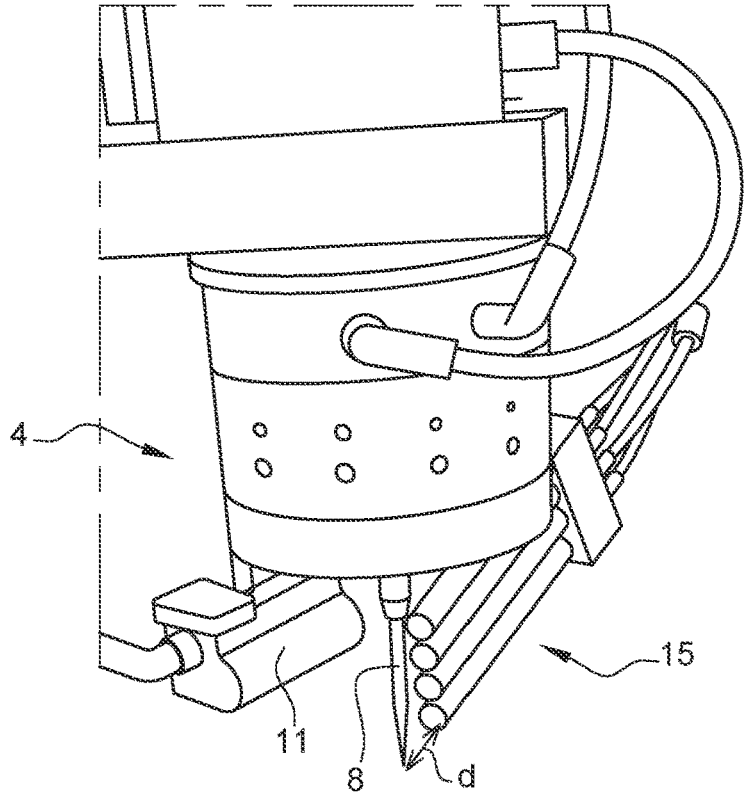
FIG. 4 is a schematic and perspective view of a processing head of an additive manufacturing installation according to the disclosure.

With reference to FIGS. 2 and 4, the installation 1 comprises a spray nozzle of a cooling element for the feed nozzle 8 of the material so that the latter does not heat up as a result of the high temperatures of the energy required for melting the material.

The spray nozzle 15 is directed towards the feed nozzle 8 of the material and at a distance from it. In the example shown in FIG. 4, several spray nozzles are directed toward the feed nozzle. The nozzles 15 are superimposed in a direction parallel to the axis of the feed nozzle (here the radial axis) so as to achieve an efficient and uniform cooling of the feed nozzle 8 over its entire height or length. The number of nozzles is between 1 and 5. Advantageously, the number of nozzles depends on the height of the feed nozzle.

In order to effectively cool the feed nozzle 8, the cooling element is projected at a pressure of between 1 and 3 bar. This pressure is sufficient to cool the nozzle but does not cause any disturbance to the fusion bath.

Advantageously, but not restrictively, the spray nozzle 15 of the cooling element is arranged at a distance d of between 3 and 10 cm from the feed nozzle 8. The nozzle 15 moves simultaneously with the feed nozzle 8 to ensure a continuous cooling of the feed nozzle 8.

In an advantageous, but not limiting, characteristic, the spray nozzle 15 is mounted on a support of the material feed elements 5 so that their movements are simultaneous. In other words, the spray nozzle or the spray nozzles 15 and the feed nozzle 8 are fixed with respect to each other.

The cooling element comprises an inert gas such as Argon or Nitrogen, which allows to prevent the oxidation of the component being manufactured. Indeed, the spray nozzle 15 is also installed in the enclosure (which is closed here) and being at a distance from the processing head 4, the gas that cools the feed nozzle fills the enclosure creating a protective atmosphere. The temperature of the gas is approximately that of the ambient air, i.e. about 20° C. and therefore relatively cooler than the temperature of the fusion bath (at 2000° C.) in the feed nozzle.

We will now describe the method for manufacturing the turbomachine component, using the installation 1 described above. The method comprises a step of supplying the material into the feed nozzle 8. In this supply step, the material is fed into the nozzle 8 in the form of wire, in this case metallic, as we have seen previously.

The method comprises a step of projecting energy toward the material so as to cause the melting of the material leaving the feed nozzle. The material that has melted is then deposited as a bead of material along a first direction on the manufacturing support.

Several beads of material are deposited next to each other in a second direction (transverse axis Y) on the manufacturing support 6 and then layer after layer in a third direction, here parallel to the vertical axis.

The method comprises a step of cooling the feed nozzle 8 during the energy projection step. The inert gas used during this step is sprayed onto the feed nozzle and simultaneously with the energy projection step so that the feed nozzle does not heat up and the material bead is of good quality. Advantageously, the cooling element is projected over the entire height of the feed nozzle. Advantageously, the projection of the cooling element is continuous. By continuous, it is understood that the projection of the cooling element is performed during at least the entire energy projection step without interruption of the projection of the cooling element. However, the projection pressure may vary, for example.

Advantageously, the cooling step is carried out during the projection and deposition step of the material.

The invention claimed is:

1. A method for manufacturing a component in a form of a plurality of superposed layers of a material on a manufacturing support, the method comprising the steps of:
    supplying the material into a feed nozzle;
    projecting energy towards the material to cause the material to melt on the manufacturing support; and
    cooling the feed nozzle by means of a cooling element during the energy projection step, wherein the cooling element is projected over an entire height of an external surface of feed nozzle to maintain geometric characteristics of feed nozzle, wherein the energy projection element is directed towards the material leaving the feed nozzle so as to melt the material before it is deposited on the manufacturing support.

2. The method according to claim 1, wherein the material is in a form of wire.

3. The method according to claim 1, wherein the material is metallic.

4. The method according to claim 1, wherein the cooling element is projected at a pressure of between 1 and 3 bar.

5. The method according to claim 1, wherein the cooling element has a temperature in a range of 20° C.

6. The method according to claim 1, wherein the cooling element is a neutral gas flow.

7. The method according to claim 1, wherein the energy projection step is performed with a laser beam.

8. The method according to claim 1, wherein the projection of the cooling element is continuous.

9. The method according to claim 1, wherein the method comprises wire laser metal deposition (LMD) additive manufacturing.

10. The method according to claim 1, further comprising a step of depositing the material on the manufacturing support, the step of cooling the feed nozzle being carried out during the projection and deposition step.

11. An installation for carrying out a method for manufacturing a component in a form of a plurality of superposed layers of a material on a manufacturing support, the installation comprising a feed nozzle for the material for manufacturing the component and an element configured to project energy towards the material to melt the material on the manufacturing support, wherein at least one spray nozzle is configured to project a cooling element onto an external surface of feed nozzle and over an entire height of the feed nozzle to maintain a geometric characteristics of feed nozzle.

12. The installation according to claim 11, wherein the spray nozzle is arranged at a distance of between 3 and 10 cm from the feed nozzle and being distinct from the spray nozzle.

13. The installation according to claim 11, wherein the spray nozzles are arranged one above the other in a direction parallel to a height of the feed nozzle.

14. The installation according to claim 11, wherein the spray nozzle or all the spray nozzles and the feed nozzle are fixed relative to each other.

15. The method according to claim 6, wherein the neutral gas flow is nitrogen or argon.

16. The method according to claim 1, wherein the component is a turbomachine component.

17. The installation according to claim 11, wherein the component is a turbomachine component.

18. The method according to claim 1, wherein cooling element is projected at outside the feed nozzle and at a predetermined distance from the feed nozzle, the cooling element is projected transversely.

19. The installation according to claim 11, wherein the element configured to project energy is arranged at the opposite of the feed nozzle and outside the feed nozzle.

20. The installation according to claim 19, wherein the element configured to project energy is arranged at the opposite of the feed nozzle and has an axis coaxial with the axis of the feed nozzle.

21. The installation according to claim 19, wherein the element configured to project energy is arranged in a head which is distinct and separate from the feed nozzle.

22. The installation according to claim 21, wherein the element configured to project energy has an axis transversal with the axis of the feed nozzle.

23. A method for manufacturing a component in a form of a plurality of superposed layers of a material on a manufacturing support, the method comprising the steps of:

supplying the material into a feed nozzle;

projecting energy towards the material to cause the material to melt on the manufacturing support; and cooling the feed nozzle by means of a cooling element during the energy projection step, wherein the cooling element is projected over an entire height of the feed nozzle to maintain geometric characteristics of feed nozzle, wherein several spray nozzles are arranged one above the other in a direction parallel to a height of the feed nozzle and the cooling element is projected along a direction perpendicular to the entire height of the feed nozzle, wherein the energy projection element is directed towards the material leaving the feed nozzle so as to melt the material before it is deposited on the manufacturing support.

* * * * *